(12) United States Patent
Scozzafava

(10) Patent No.: US 8,417,589 B2
(45) Date of Patent: Apr. 9, 2013

(54) METHOD OF CONDUCTING BUSINESS FOR MAKING AND SELLING ARTICLES OF APPAREL HAVING INTERCHANGEABLE PARTS

(75) Inventor: Frank Charles Scozzafava, New York, NY (US)

(73) Assignee: Mix Bikini Inc., Clermont, FL (US)

( * ) Notice: Subject to any disclaimer, the term of this patent is extended or adjusted under 35 U.S.C. 154(b) by 504 days.

(21) Appl. No.: 12/611,811

(22) Filed: Nov. 3, 2009

(65) Prior Publication Data
US 2011/0106663 A1    May 5, 2011

(51) Int. Cl.
G06Q 30/00    (2006.01)
(52) U.S. Cl.
USPC ......................................... 705/27.1; 705/26.1
(58) Field of Classification Search ......... 705/26.1–27.2
See application file for complete search history.

(56) References Cited

U.S. PATENT DOCUMENTS

| | | | |
|---|---|---|---|
| 6,601,042 B1 | 7/2003 | Lyden | |
| 7,016,867 B2 | 3/2006 | Lyden | |
| 2002/0072974 A1* | 6/2002 | Pugliese et al. | 705/14 |
| 2003/0033207 A1* | 2/2003 | Litke et al. | 705/26 |
| 2004/0203683 A1 | 10/2004 | Engstrom et al. | |
| 2005/0177453 A1* | 8/2005 | Anton et al. | 705/26 |
| 2006/0059720 A1* | 3/2006 | Phelan | 36/101 |
| 2006/0249172 A1 | 11/2006 | Ballew | |
| 2007/0179853 A1* | 8/2007 | Feige et al. | 705/14 |

OTHER PUBLICATIONS

Morago, G. (Jul. 10, 2000). Customizing for the masses bespoke levi's? surely nothing could be further removed from the traditions of saville row. yet jeans are just one of many mass-market garments and accessories that are part of the made-to-order trend. Star Tribune.*

* cited by examiner

Primary Examiner — Jeffrey A Smith
Assistant Examiner — Resha Desai
(74) Attorney, Agent, or Firm — Hoffmann & Baron, LLP; Betsy Kingsbury Dowd

(57) ABSTRACT

A method of conducting business for selling to a purchaser an article of apparel having interchangeable parts comprising the steps of offering for sale to a purchaser a multiplicity of base units of an article of apparel and a multiplicity of interchangeable components; providing a location for the purchaser to update the base unit with a purchase of a multiplicity of interchangeable components; creating an electronic purchaser user account to allow a purchaser to place an order of base units for the article of apparel and the interchangeable components; delivering the selected components to the purchaser; and updating the purchaser's user account to reflect the delivered components.

16 Claims, 3 Drawing Sheets

METHOD OF CONDUCTING BUSINESS FOR MAKING AND SELLING ARTICLES OF APPAREL HAVING INTERCHANGEABLE PARTS

BACKGROUND OF THE DISCLOSURE

This disclosure pertains generally to a method of conducting business for making and selling articles of apparel, particularly to footwear and/or handbags, with interchangeable components, and more specifically, to a method and system for purchasers to purchase a shoe or bag and subsequently purchase interchangeable components for the purchased shoe or bag. Moreover, the present disclosure describes a method for marketing and selling such articles of apparel.

Conventionally, shoes and handbags, like other consumer goods, are generally bought by purchasers as a single item purchase. Purchasers visit shopping malls or department stores where these visits are for a specific purpose (i.e. the purchaser is looking to purchase a particular item) or merely to browse until the purchaser sees something of interest to purchase. In either case, a purchase within a typical store is a one-time event. There is nothing in the sale to retain or encourage future patronage. Moreover, no purchaser information (besides credit card payment information) is recorded or saved by the store.

With the increased popularity of the World Wide Web, purchasers increasingly make purchases over the internet through a website sale. However, the full utility offered to web retailers by the internet has not been realized. Currently, purchasers visit department store websites to view and select items supplied by numerous manufacturers. This allows purchasers to compare and contrast similar items before ultimately selecting the desired item. Alternatively, purchasers visit the website of a specific manufacturer to order a specific item. In most cases, payments for purchases are made using a consumer credit card. As an added feature, a website frequently allows a purchaser to create a user account whereby credit card and order history information is stored for later use by the store. However, order information is not available to purchasers in an interactive format allowing purchasers to mix and match the articles purchased.

Thus, there is a long-felt need for a method of conducting business for making and marketing an interchangeable shoe or handbag which prompts purchasers to continue to make subsequent purchases and to modify the initial purchase using an interactive computer interface. Furthermore, there is a need to provide purchasers with a real or virtual method to purchase apparel comprised of interchangeable components. There is a long felt need to provide purchasers with the ability to become his or her own fashion designer through the use of interchangeable components found on the shoe or handbag. One example of a shoe having interchangeable components is found in U.S. patent application Ser. No. 11/307,460 to Scozzafava, which is hereby being incorporated by reference.

SUMMARY OF THE DISCLOSURE

The present disclosure generally comprises a method for conducting business and marketing apparel whereby a purchaser purchases a "kit" for an article of apparel or clothing having interchangeable parts which allows for subsequent purchases of additional interchangeable components to modify the initial purchase.

It is accordingly a primary object of the present disclosure to provide a method for conducting business and marketing apparel having interchangeable components in a retail store setting with physical work stations containing a multiplicity of actual interchangeable apparel components, as well as virtual work stations comprising a computer interface having electronic depictions of interchangeable apparel components.

It is another object of the present disclosure to provide an opportunity for retailers to create stores-within-a-store or simply stock starter kits that lead customers to the apparel company's website for additional products.

It is yet another object of the present disclosure to provide an online destination where purchasers can build a virtual closet, keep track of their styles and "try out" new selections—ones that they can purchase or put in a gift registry that friends and relatives can explore and purchase on birthdays and holidays.

It is still a further object of the present disclosure to provide a marketing resource for other businesses by the apparel company utilizing its online sales and community profiles to let advertisers target purchasers who are too young to have a credit card.

It is yet another object of the present disclosure to provide a method for conducting business and marketing apparel having interchangeable components wherein a purchaser creates a user account which is stored on a database where the user account displays an interactive virtual closet containing electronic depictions of the physical merchandise in the purchaser's possession, or in a purchaser's wish list.

Additional objects and advantages will become apparent and a more thorough and comprehensive understanding may be had from the following description and claims taken in conjunction with the accompanying drawings forming a part of this specification.

DESCRIPTION OF THE DRAWINGS

The present disclosure and the manner in which it may be practiced is further illustrated with reference to the accompanying drawings wherein.

DETAILED DESCRIPTION OF THE DISCLOSURE

Figure 1:
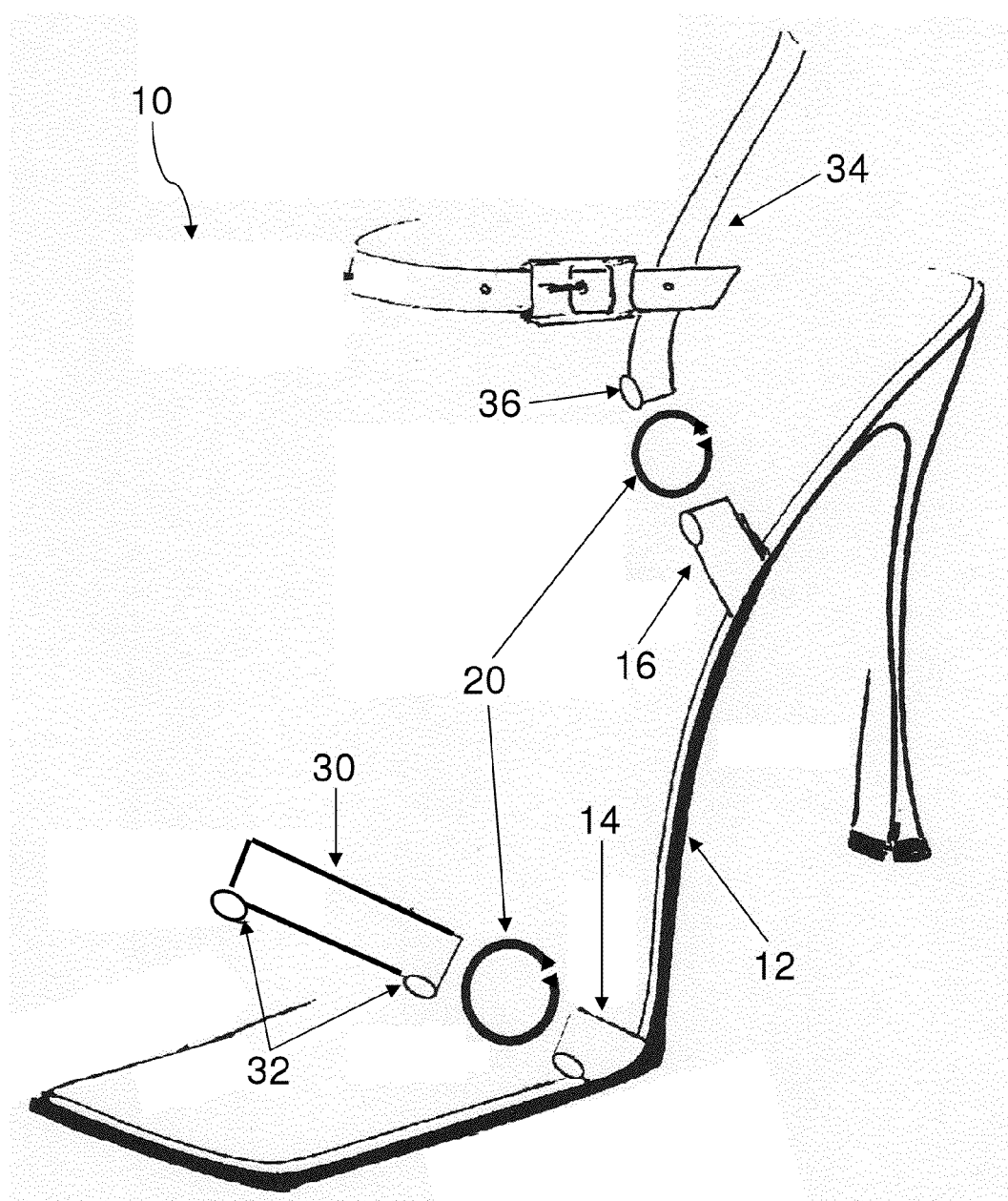
FIG. 1 is an exploded view of one embodiment of a shoe of the present disclosure.

At the outset, it should be clearly understood that like reference numerals are intended to identify the same structural elements, portions, or surfaces consistently throughout the several drawing figures, as may be further described or explained by the entire written specification of which this detailed description is an integral part. The drawings are intended to be read together with the specification and are to be construed as a portion of the entire "written description" of this disclosure as required by 35 U.S.C. §112.

The present disclosure teaches a method of conducting business for making and selling women's apparel, such as shoes and handbags. The concept is to build a community online to allow today's purchaser to funnel his or her creativity into myriad fashion statements by creating articles of footwear and clothing using interchangeable parts. The instant method of conducting business blends a mix of marketing and technology so that the purchaser experiences: creativity, fashion and technology. In the preferred embodiment, the step-by-step features of this method of doing business are as follows: first, an actual retail store is set up in a typical mall location. The retail store has physical work stations where purchasers have hands-on experience creating new articles of appeal with samples. The retail store is further provided with virtual work stations where purchasers design new shoes and accessories on a computer work station. The virtual work station allows purchasers to compare designs of other purchasers and design unique articles of apparel virtually on a computer screen from a myriad of interchangeable parts. The virtual completed article of apparel is subsequently actually created by the store employees and shipped to any destination directed by the purchaser. The retail store is designed to be a place where creativity, fashion, technology and even a little competition is commonplace. Competition is fostered by the purchaser's ability to access the computers database and compare designs of other purchasers.

The retail store further comprises an atmosphere in which music and music videos are exhibited for the purpose of motivating a purchaser by stimulating the senses. The store has a large video display that has all of the latest store offerings and a sneak peek of what is on the horizon for seasons coming up. The store has a physical trial station to make sure the purchaser knows his or her sizing, or to interact with samples to see if what he or she has heard about or seen online is what he or she envisioned. The store has a computerized video terminal available to be used by the purchaser to access account information with a computer compatible digital member card or a cardless logon by user name and password. Members/purchasers are rated based upon use and experience. Some examples of ratings are, "junior" designer, "senior" designer, or an established "head" designer or somewhere in between. Member ratings are based on factors that apply to the purchaser's account, such as number of purchases, number of designs created and number of years of membership and the like. Members having achieved a designated rating are rewarded with distinct privileges.

When the purchaser logs in to the computer system, his or her own "virtual closet" is displayed on the monitor. The virtual closet screen lists the inventory the purchaser has purchased and lists what items the purchaser wishes to purchase in the form of a purchase order for items that have been bookmarked for future purchase. The computer software within the virtual closet allows purchasers to create unique articles of apparel by experimentation with different articles of apparel with interchangeable parts such as bags or shoes and the like. The purchasers have the ability to compare his or her creations to other creations made by other purchasers working on any video terminal in the system. The system also allows for creations to be inspired by a related media found online such as advertisements, fashion blogs and the like.

Once a purchaser creates an article of apparel such as clothing or foot apparel the purchaser confirms the sale of the items in the computer terminal. Purchases are itemized within a virtual shopping cart, the computer system automatically updates the purchasers inventory within the virtual closet and processes and forwards this information to the staff in the distribution center. The distribution center packages the product and it is physically delivered to any location the purchaser directs and the purchaser's credit card on file is debited.

Purchasers are classified into membership levels. Membership levels are based upon sales and longevity. Credits are earned and accumulate as purchases are made; the more credits earned, the higher level a member/purchaser achieves. Higher membership level translates into special privileges within the retail store. If the purchaser has earned the specified number of credits to attain the status of a senior designer, or the like, the purchaser gains access to a special location only accessible to members having a particular designated membership status. The purchaser can access this special location while waiting for his or her shopping bag to be prepared in the distribution center. This special location, or VIP room, is equipped with assembly tables and a refreshment area having musical entertainment such as disc jockeys spinning records, live music, and the like. Credits are used to purchase almost anything in the VIP room such as a round of pre-packaged, private-label smoothies for the purchaser. This membership privilege which accompanies a sale of merchandise is a method of doing business different than the typical store purchase, i.e. the purchase is more than just ordering and picking up a piece of merchandise. The purchase in this method includes a purchaser creating a unique article of apparel while being part of a unique fashion experience.

The preferred articles of apparel are shoes and handbags. The article apparel having interchangeable parts is comprised of a base (a sole in the case of a shoe; a bag in the case of the handbag), at least one interchangeable strap, and at least one set of interchangeable clips used to attach the interchangeable strap to the base unit. Purchasers buy a kit which comprises components sufficient to complete one pair of shoes or one complete handbag. Purchasers also create a user account using a computer terminal, either at home or within the store. Accessing the account shows the purchaser his or her virtual closet—the inventory the purchaser has purchased or has selected for future purchase. Purchasers then view interchangeable components for a potential purchase. The virtual closet allows the purchaser to interactively examine the potential purchase with components already within his or her inventory. Once a new component is selected and paid for, the purchaser's virtual closet is updated to show the addition. If purchased at home over the internet, the components are shipped to any location the purchaser directs. If the components are purchased at a physical store location, a member of the store staff will retrieve the items from the store's inventory and the purchaser has the option to have the item shipped to any address or to take the product at that time. Additionally, purchases are electronically tracked and are subject to a membership rewards program wherein the purchaser gains special privileges at specified purchase levels.

The above and other objects are accomplished in accordance with the present disclosure by provision of an article of apparel having interchangeable components. Examples of particular articles of apparel include a shoe or handbag comprised of a three part clip-and-loop design, with the ability to interchange the straps, clips, or other accessories. The shoes or handbags are offered to purchasers using a business method wherein purchasers create a user account and purchase interchangeable components sufficient to create one complete article of apparel. This can either be through purchaser-selected individual components, or by purchasing a "kit." The shoe kit contains a shoe base, one set of clips, and the necessary straps to create a complete pair of shoes. The handbag kit contains a bag base, one set of clips, and the necessary straps to create a complete handbag. Once a purchaser purchases a kit having a base unit and interchangeable clips for attaching interchangeable straps or other interchangeable accessories to the base, the purchaser subsequently purchases additional interchangeable components to modify the initial kit.

Once sufficient components for one complete article, or a kit, has been purchased, purchasers then go to a physical store location or to a website on the internet to purchase additional interchangeable components such as a new shoe base having a higher or shorter heel, a different size or style handbag base, a different style of clips, or straps of different colors or materials. The purchaser accesses his or her user account using a computer through either a computer compatible digital membership card or by inputting his or her user name and password. The purchaser's electronic membership account contains a virtual closet which displays all of the items and components previously purchased by that purchaser, or purchase orders for items the purchaser has selected for a future purchase. An electronic display is available for the purchaser to archive a wish list of additional future purchases. The electronic display enables the purchaser to interactively view any future purchase order and interchange these potential purchases with electronic pictures of items already purchased to design a new unique product and simultaneously place a new order. In this way the purchaser can virtually observe the product before it's actually made. Using this method the purchaser can create an article of apparel such as a shoe or handbag that is totally unique to that purchaser.

Adverting now to the drawings, FIG. 1 shows an article of apparel which is a product created and purchased by a purchaser in the method as described above. Footwear article 10 is made up generally of shoe base 12 having foot strap loop 14 and ankle strap loop 16; foot strap 30 having loop ends 32, where one loop end 32 is removably attached to shoe base loop 14 by a first clip 20; and ankle strap 34 having loop end 36 which is removably attached to shoe base loop 16 by a second clip 20. Although only the left side of shoe base 12 is shown in FIG. 1, the right side of shoe base 12 is constructed in an identical manner as described above. Specifically, the interchangeable shoe is constructed through a three-piece system, as opposed to only a two-piece system. In a preferred embodiment, interchangeable clips 20 are connected to the shoe base by slipping one clip onto each of the loops 14 and 16. These clips can be selected, for instance, to coordinate with the wearer's wardrobe and can be made out of any suitable material, including but not limited to metal, plastic, ceramic, glass, etc. Interchangeable strap 30 is then attached to the clips in place at the foot of the shoe base, while interchangeable strap 34 is attached to the clips at the ankle position of the shoe base. Again, straps 30 and 34 can be selected to coordinate with the wearer's wardrobe and can be constructed of any suitable material, including but not limited to cloth fabric, leather, plastic, etc. Conversely, clips 20 can be attached to the straps before being attached to the shoe base loops.

Figure 2:
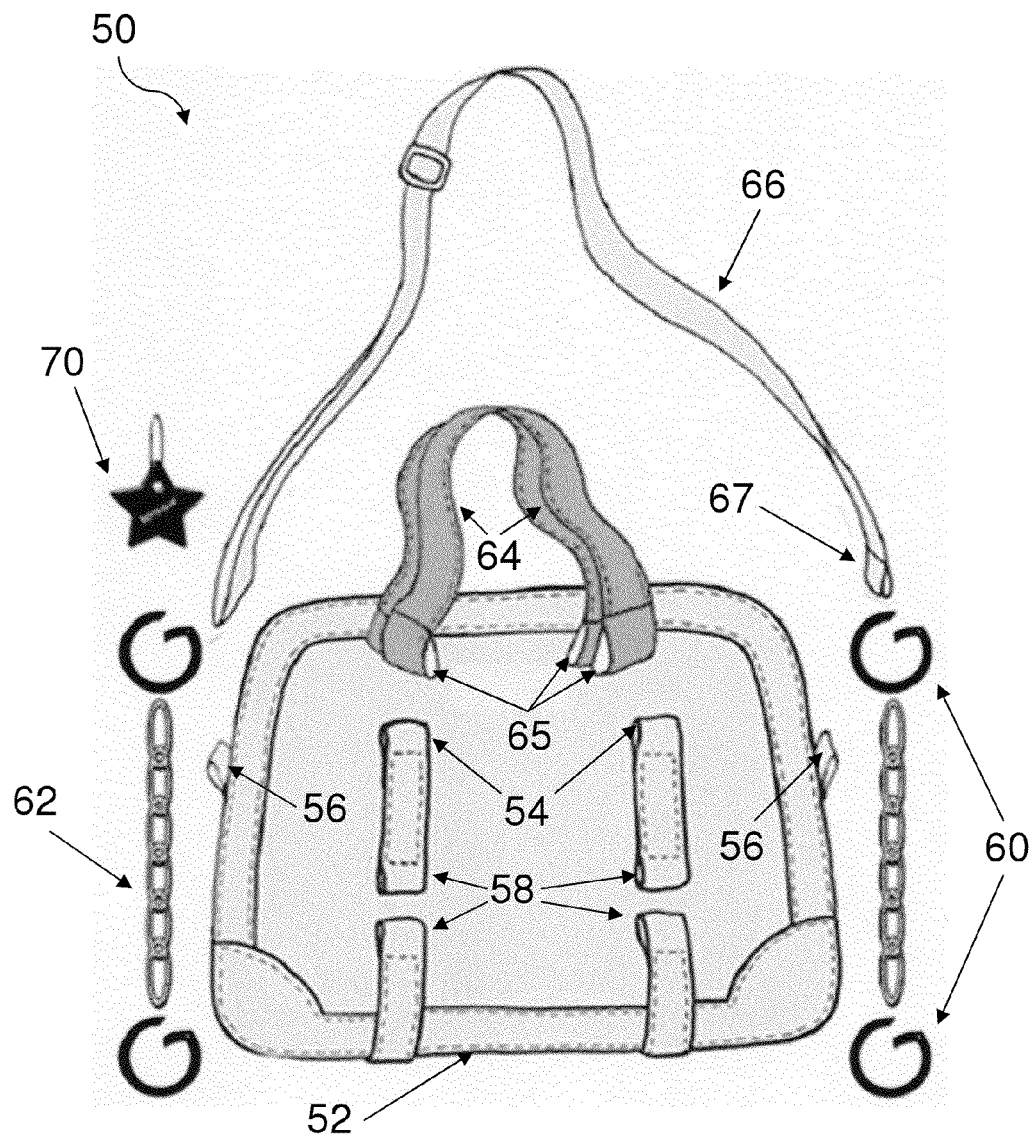
FIG. 2 is an exploded view of one embodiment of a handbag of the present disclosure.

FIG. 2 shows an example of an article of apparel such as a handbag 50 that is typically created and purchased by purchaser in the method as described above. Handbag article 50 is made up generally of bag base 52 having a integrated loops 54 and/or 56; and optionally, handles 64 having loop ends 65, where a first loop end 65 is removably attached to a first bag base loop 54 by a first clip 60 while a second loop end 65 is removably attached to a second base loop 54 by a second clip 60; and optionally, adjustable shoulder strap 66 having a first loop end 67 which is removably attached to a first bag base loop 56 by a third clip 60 while a second loop end 67 is removable attached to a second bag base loop 56 by a fourth clip 60. A completed bag is comprised of a bag base with two attached handles, a bag base with a shoulder strap attached, or a bag base having both handles and a strap attached. Although only the front side of bag base 52 is shown in FIG. 2, the back side of shoe base 52 is constructed in an identical manner as described above.

Specifically, the interchangeable handbag is constructed through a three-piece system wherein interchangeable clips 60 are connected to the bag base by slipping one clip onto each of the loops 54 and/or loops 56. These clips can be selected, for instance, to coordinate with the handbag owner's wardrobe and can be made out of any suitable material, including but not limited to metal, plastic, ceramic, glass, etc. Interchangeable adjustable shoulder strap 66 and/or handles 64 are then attached to the clips previously attached to the bag base. Again, straps 66 and 64 can be selected to coordinate with the handbag owner's wardrobe and can be constructed of any suitable material, including but not limited to cloth fabric, leather, plastic, etc. Conversely, clips 60 can be attached to the straps before being attached to the bag base loops. Clips 60 are hooplike members that can be round, rectangular, roughly D-shaped, or any other shape. Clips can have an open profile, or a closed profile. Closed profile clips can use a carabiner-like closing mechanism. Optionally, clips 60 can further comprise a spur on the interior surface of one or both open ends of the clip gap. These spurs prevent the straps from slipping free of the clips while the bag is being carried.

Additionally, the handbag of a preferred embodiment of the present disclosure comprises a bag base 50 having additional integrated loops 58. The number of additional integrated loops can be of any number and is not limited to that shown in FIG. 2. Additional loops 58 are used to accessorize the handbag using additional interchangeable components, such as but not limited to charms 70 and chains 62. Each of the components may be attached to the bag base loops using clips 60 or by an integrated clip on the component.

Figure 3:
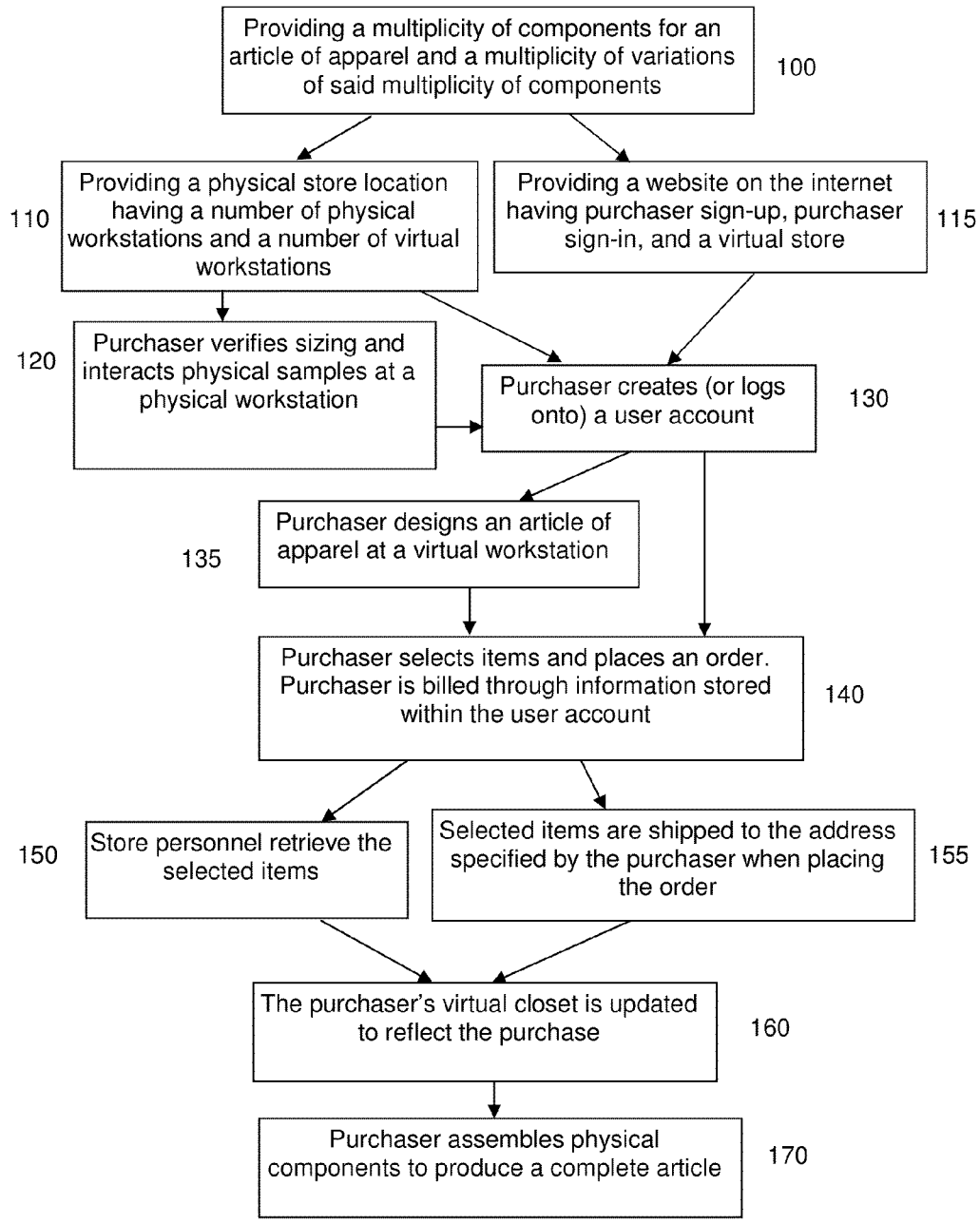
FIG. 3 is a flowchart showing one possible method of conducting business as in one embodiment of the present disclosure.

A preferred embodiment of a method of conducting business to sell an interchangeable article of apparel is shown in FIG. 3. Step 100 provides a multiplicity of components for an article of apparel and a multiplicity of variations of the multiplicity of components. These components include, but are not limited to, a base unit, straps, clips, and accessories. Each of the multiplicity of components are interchangeable units, which when properly assembled, form a complete article of apparel.

Steps 110 and 115 entail providing a physical retail store for the sale of articles of apparel and components of the interchangeable parts for the articles of apparel. In Step 110, a physical store location is provided while Step 115 provides for a virtual store through a website on the internet. The physical store location has multiple physical workstations where purchasers are provided with a hands-on experience with physical samples of the interchangeable components of the apparel. The store also has a number of virtual workstations comprising computer workstations. The computer workstations display virtual representations of the physical components of the interchangeable articles. This allows the purchaser the ability to create a completely unique article of apparel through virtual experimentation. Once the purchaser has completed all the experimentation on the virtual webpage and decides that the work is complete, a purchase order is made and the actual product is created. The virtual store in Step 115 is similar to, and includes additional features as the in-store virtual workstations. The virtual store further contains options to purchase and ship merchandise ordered through an internet sale. While at the physical store location, a purchaser works at a physical workstation to make sure that sizing is correct, as well as to physically interact with components (Step 120).

In Step 130, the purchaser creates a membership account through computerized electronic access to a database or logs onto an existing user account which is stored on a database. Membership information is accessed at either an in-store virtual station, or at a virtual store over the internet. The user account contains that particular purchaser's supplied information, as well as a record of each product purchased. The user account is user name and password protected, so as to be accessible only to that particular user. The purchaser's account information is viewed on any computer terminal which is depicted in the purchaser's virtual closet. The virtual closet is specific to the purchaser whose user name and password were used to log onto the database and contains electronic, virtual depictions of the user's inventory. This inventory consists of all prior purchases or gifts, as well as those items the user has designated for future purchases through purchase orders.

In Step 135 the purchaser is working at a virtual location designing the article that he or she wishes to purchase. This can either be at a virtual workstation in a physical store location, or through a virtual store location accessed by any internet accessible device such as a purchaser's home computer or web-enabled mobile device. At the physical store location, purchasers use the physical and/or virtual stations to design new shoes or handbags and to compare multiple designs to create the exact final product desired within a virtual closet. The virtual closet allows a user to virtually create new articles of apparel prior to physically constructing the article of apparel. The virtual creation of an article of apparel alleviates the need to repeatedly physically disassemble and reassemble an article to achieve the desired end product. The virtual closet saves time and decreases the wear-and-tear on each physical component, thus extending the usable lifetime of the components. The database storing each user's virtual closet is also accessible through a website on the internet or through workstations in the actual retail store. Thus, a purchaser can design and shop anywhere at anytime and is not limited to only purchasing at a physical store location.

In Step 140, the purchaser selects and places a purchase order for the components he or she wishes to purchase during this shopping experience. The finished products are paid for automatically using electronic billing information stored on the database within the specific user/purchaser account. The purchase order is sent to store personnel who retrieve the selected items from inventory located in a non-purchaser accessible portion of the store (Step 150). Importantly, at the physical store location, the purchaser does not retrieve the selected item/items from inventory. The purchaser is free to continue browsing, designing future purchases, or to do any other activity. The purchaser's shopping experience is enhanced by providing a special VIP location with the physical store location. The VIP location is accessible only to purchasers who have attained a sufficient "designer" level based on their total purchases. The VIP location contains special amenities such as a refreshment center, dance area, and access to the store DJ for selecting music to be played within the store. If an order was placed through an internet purchase, the selected items are shipped to the address specified by the purchaser when placing the order (Step 155).

In Step 160, the virtual closet is updated to reflect the new purchase. Thus, a purchaser's inventory is always up-to-date allowing the purchaser to continue designing new articles of apparel with whatever interchangeable components he or she already has, as well as plan for future purchases. In Step 170, once the interchangeable components have been received, the purchaser assembles the components to produce a completed article.

In an alternative embodiment, purchasers purchase a "kit" containing a base unit, one set of clips, and any necessary straps to construct one complete article (i.e. one pair of shoes or one complete handbag). This kit is comprised of components most commonly selected by purchasers, for example in the case of shoes, components to make a commonly purchased pair of non-changeable shoes (for example, a pair of black pumps or black high heel stilettos). This kit is purchased at a physical store location operating specifically for the sale of articles of apparel having interchangeable components, through the internet, or at a non-dedicated physical location such as a department store. These kits allow the purchaser to quickly and easily purchase an article of apparel.

Sales locations having kits may be more numerous and be more geographically widespread allowing the base article of apparel to reach a greater number of purchasers. Purchasers physically try out an article of apparel from a kit and later access the virtual store to purchase additional components for the base unit purchased in the kit. Once the kit has been purchased, purchasers then return to the physical store location or virtual location and selectively purchase additional individual components to add to or swap with the originally purchased article similar to the method described in FIG. 3. However, if a physical store location dedicated solely to selling articles of apparel as described in this disclosure is not conveniently located near a purchaser, the purchaser can still gain a portion of the experience by purchasing a kit from a non-dedicated location such as a department store at the local mall and then accessing the virtual store to design and modify the original kit purchase.

Although the disclosure has been described with reference to certain preferred embodiments, it will be appreciated by those skilled in the art that modifications and variations may be made without departing from the spirit and scope of the disclosure. It should be understood that applicant does not intend to be limited to the particular details described above and illustrated in the accompanying drawings.

What I claim is:

1. A computer-implemented method of conducting business for selling to a purchaser an article of apparel having at least one base unit and interchangeable components, the method comprising:

offering for sale to said purchaser through a computer workstation operable by said purchaser a multiplicity of base units and a multiplicity of interchangeable components for assembling the article of apparel, the computer workstation comprising a database, a computer display, a user interface, and a processor, images of said multiplicity of base units and said multiplicity of interchangeable components being saved in said database for viewing on the computer display;

displaying on the computer display to said purchaser before a purchase is made a virtual design of the article of apparel comprising at least one of said base units with one or more of said multiplicity of interchangeable components, the at least one base unit and the one or more interchangeable components for composing the virtual design being selected from the database by said purchaser;

saving by the processor the virtual design of the article of apparel in the database for later access and viewing on the computer display by said purchaser and by other potential purchasers;

creating by the processor an electronic purchaser user account in said database to allow said purchaser to select for purchase components from said multiplicity of base units and said interchangeable components;

electronically tracking delivery of said selected components upon purchase to said purchaser associated with said electronic purchaser user account; and updating by said processor said purchaser's user account in said database to reflect delivery of said selected components, wherein said purchase to said purchaser is made within a retail store, the computer workstation being located at the retail store, and wherein said retail store includes a special location within said store only accessible to purchasers having a specified membership status.

2. A method of conducting business for selling to a purchaser an article of apparel having interchangeable components of claim 1 wherein said article of apparel is a shoe and said at least one base unit is a shoe base.

3. A method of conducting business for selling to a purchaser an article of apparel having interchangeable components of claim 1 wherein said article of apparel is a handbag and said at least one base unit is a bag base.

4. A method of conducting business for selling to a purchaser an article of apparel having interchangeable components of claim 1 wherein said interchangeable components comprise clips and straps.

5. A method of conducting business for selling to a purchaser an article of apparel having interchangeable components of claim 4 wherein said interchangeable components further comprise charms, medallions, and figurines.

6. A method of conducting business for selling to a purchaser an article of apparel having interchangeable components of claim 1 wherein said virtual design and said images of said multiplicity of base units and said multiplicity of interchangeable components saved in said database are accessed via a virtual store on a web page.

7. A method of conducting business for selling to a purchaser an article of apparel having interchangeable components of claim 6 wherein said article of apparel that is virtually ordered from said retail store is shipped to an address specified by said purchaser.

8. A method of conducting business for selling to a purchaser an article of apparel having interchangeable components of claim 1 wherein said electronic purchaser user account is a virtual closet inventorying past purchases and establishes a purchase order for future purchases.

9. A method of conducting business for selling to a purchaser an article of apparel having interchangeable components of claim 8 wherein said electronic purchaser user account monitors purchase orders and assigns a membership level based upon purchases.

10. A method of conducting business for selling to a purchaser an article of apparel having interchangeable components of claim 9 wherein said purchaser's account is updated to reflect elevated membership status based on purchases.

11. A method of conducting business for selling to a purchaser an article of apparel having interchangeable components of claim 8 wherein said purchase orders are listed electronically in said virtual closet for others to view as a gift registry.

12. A method of conducting business for selling to a purchaser an article of apparel having interchangeable components of claim 11 wherein purchases made by others from said purchaser's virtual closet are credited to said purchaser's membership level.

13. A method of conducting business for selling to a purchaser an article of apparel having interchangeable components of claim 8, wherein said retail store offers for sale a pre-selected base unit selected from the multiplicity of base units and pre-selected interchangeable components selected from the multiplicity of interchangeable components to form one complete article of apparel.

14. A method of conducting business for selling to a purchaser an article of apparel having interchangeable components of claim 1, wherein said computer workstations are configured with access to virtual closets.

15. A method of conducting business for selling to a purchaser an article of apparel having interchangeable components of claim 1, wherein said purchase order is processed on said computer workstation and said selected components are delivered directly to said purchaser in said retail store.

16. A method of conducting business for selling to a purchaser an article of apparel having interchangeable components of claim 1, wherein said special location comprises assembly tables and a refreshment area.

\* \* \* \* \*